(12) United States Patent
Chawla et al.

(10) Patent No.: US 10,480,084 B1
(45) Date of Patent: Nov. 19, 2019

(54) MODULAR COOLING CHAMBER FOR MANIFOLD OF GASEOUS ELECTROLYSIS APPARATUS WITH HELIUM PERMEABLE ELEMENT THEREFOR

(71) Applicant: Marathon Systems, Inc., Farifax, VA (US)

(72) Inventors: Monte S Chawla, University Park, MD (US); Randolph R Davis, Fairfax, VA (US); Frederick L Sandel, Fairfax Station, VA (US)

(*) Notice: Subject to any disclaimer, the term of this patent is extended or adjusted under 35 U.S.C. 154(b) by 0 days.

(21) Appl. No.: 15/449,895

(22) Filed: Mar. 3, 2017

Related U.S. Application Data

(60) Provisional application No. 62/389,549, filed on Mar. 3, 2016.

(51) Int. Cl.
| | |
|---|---|
| C25B 9/00 | (2006.01) |
| C25B 1/00 | (2006.01) |
| C25B 15/02 | (2006.01) |
| C25B 13/04 | (2006.01) |
| B01D 71/02 | (2006.01) |
| B01D 53/22 | (2006.01) |

(52) U.S. Cl.
CPC .............. *C25B 9/00* (2013.01); *B01D 53/228* (2013.01); *B01D 71/024* (2013.01); *B01D 71/027* (2013.01); *C25B 1/00* (2013.01); *C25B 13/04* (2013.01); *C25B 15/02* (2013.01); *B01D 2256/18* (2013.01)

(58) Field of Classification Search
CPC ....... B01B 53/22; B01B 53/228; B01B 69/06; B01B 71/024; B01B 71/027; B01B 2256/18; B01B 2257/11; C25B 1/00; C25B 9/00; C25B 13/04; C25B 15/02
See application file for complete search history.

(56) References Cited

U.S. PATENT DOCUMENTS

| | | | | |
|---|---|---|---|---|
| 2,986,847 | A * | 6/1961 | Stato | C23D 5/005 138/141 |
| 3,019,853 | A * | 2/1962 | McAfee, Jr. | B01D 53/22 95/53 |
| 3,250,080 | A | 5/1966 | Garwin | |
| 3,269,817 | A * | 8/1966 | Bondley | C01B 23/00 65/36 |
| 3,578,442 | A * | 5/1971 | Anderson | B01D 53/22 250/506.1 |
| 5,318,675 | A | 6/1994 | Patterson | |
| 5,411,654 | A | 5/1995 | Ahern et al. | |

(Continued)

OTHER PUBLICATIONS

"Report of the Review of Low Energy Nuclear Reactions", Department of Energy, Dec. 2004. 50 pages. (Year: 2004).*

(Continued)

*Primary Examiner* — Jason M Greene
(74) *Attorney, Agent, or Firm* — ATFirm PLLC; Ralph P. Albrecht

(57) ABSTRACT

An improved, modular cooling chamber for reaction gas product collection manifolds of a gaseous electrolysis apparatus can include a helium permeable element separating helium from hydrogen and/or deuterium reactants. This system can provide a controllable thermal gradient across the helium permeable element promoting helium transport through the cooling chamber.

20 Claims, 4 Drawing Sheets

(56) References Cited

U.S. PATENT DOCUMENTS

| | | | | |
|---|---|---|---|---|
| 6,248,221 | B1* | 6/2001 | Davis | H01M 4/86 204/228.1 |
| 7,244,887 | B2 | 7/2007 | Miley | |
| 7,893,414 | B2 | 2/2011 | Larsen et al. | |
| 8,129,656 | B2 | 3/2012 | Reichmann et al. | |
| 8,227,020 | B1 | 7/2012 | Miley | |
| 8,419,919 | B1 | 4/2013 | Boss et al. | |
| 8,440,165 | B2 | 5/2013 | Miley et al. | |
| 8,485,791 | B2 | 7/2013 | Cravens | |
| 8,508,057 | B2 | 8/2013 | Schulte | |
| 8,526,560 | B2 | 9/2013 | Miley et al. | |
| 8,603,405 | B2 | 12/2013 | Miley et al. | |
| 8,801,977 | B2 | 8/2014 | Cravens | |
| 9,540,960 | B2 | 1/2017 | Chauvin | |
| 2004/0149131 | A1* | 8/2004 | Carboneri | B01D 53/22 96/4 |
| 2009/0090241 | A1* | 4/2009 | Julbe | B01D 53/228 95/53 |
| 2015/0151242 | A1* | 6/2015 | Nagano | B01D 69/12 95/53 |
| 2018/0047461 | A1* | 2/2018 | Cohen | G21B 1/052 |
| 2018/0087165 | A1 | 3/2018 | Alcaraz et al. | |

OTHER PUBLICATIONS

Close, Frank, "Too Hot to Handle: The Race for Cold Fusion", Princeton University Press, 1991, 195 pages. (Year: 1991).*

T. F. McGraw and R. R. Davis, "Critical Factors in Transitioning from Fuel Cell to Cold Fusion Technology," 33rd Intersociety Engineering Conference on Energy Conversion (IECEC-98-1271), Colorado Springs, CO, Aug. 2-6, 1998.

G. A. Williams and J. B. Ferguson, "The Diffusion of Hydrogen and Helium through Silica Glass and other Glasses," Journal of the American Chemical Society, 44, pp. 2160-2167, 1922.

D. E. Swets et al., "Diffusion Coefficients of Helium in Fused Quartz," The Journal of Chemical Physics, 34 (1), pp. 17-22, 1961.

R. W. Lee et al., "Diffusion of Hydrogen and Deuterium in Fused Quartz," The Journal of Chemical Physics, 34(4), pp. 1062-1071, 1962.

L. Himmel et al. (ed), "Perspectives in Materials Research," National Academy of Sciences—National Research Council, pp. 254-293, 1963.

T. G. M. Oosterlaken et al. , "The Influence of Temperature Gradients on Partial Pressures in a CVD Reactor," pp. 483-488 in Materials Research Society Proceedings on "Gas-Phase and Surface Chemistry in Electronic Materials Processing," Nov. 29-Dec. 2, 1993, T. J. Mountziaris et al. (ed), 334, 1993.

A. P. Brady et al., Section III, "Permeability of Solids to Gases," in "Investigation of the Space Storability of Pressurizing Gases," NASA CR-51520, Aug. 1963.

K.S. Mazdiyasni and C. T. Lynch, "An Approach to the Preparation of Powders, Fibers, and Films of Ultra-High Purity Ceramics," ML TDR 64-269, Air Force Materials Laboratory, Sep. 1964.

W.R. Seetoo and J. W. McGrew, "Compatibility Testing of Candidate Protective Barrier Coatings and Performance Testing of Filter Vent Materials," NASA CR-72603, Jun. 16, 1969.

J. S. Masaryk and R. M. Fulrath, "Permeation in Fused Silica," Lawrence Radiation Laboratory, UCRL-18393 Rev, Feb. 1971.

"Report of the Review of Low Energy Nuclear Reactions,"Department of Energy (DOE), (DOE report) dated Dec. 1, 2004.

Printout of Lenr-canr.org webpage, https://lenr-canr.org/wordpress/?page_id=455, accessed Apr. 4, 2019.

"Evidence of Operability and Utility from Low Energy Nuclear Reaction Experiments," NUCAT Energy LLC Report Jan. 2017, dated Aug. 1, 2017, https://www.lenr-canr.org/acrobat/NagelDJevidenceof.pdf, accessed Apr. 4, 2019.

Pamela A. Mosier-Boss, et al., "Investigation of Nano-Nuclear Reactions in Condensed Matter," Defense Threat Reduction Agency (DTRA), which is available on the web at https://www.lenr-canr.org/acrobat/MosierBossinvestigat.pdf, accessed Apr. 4, 2019.

* cited by examiner

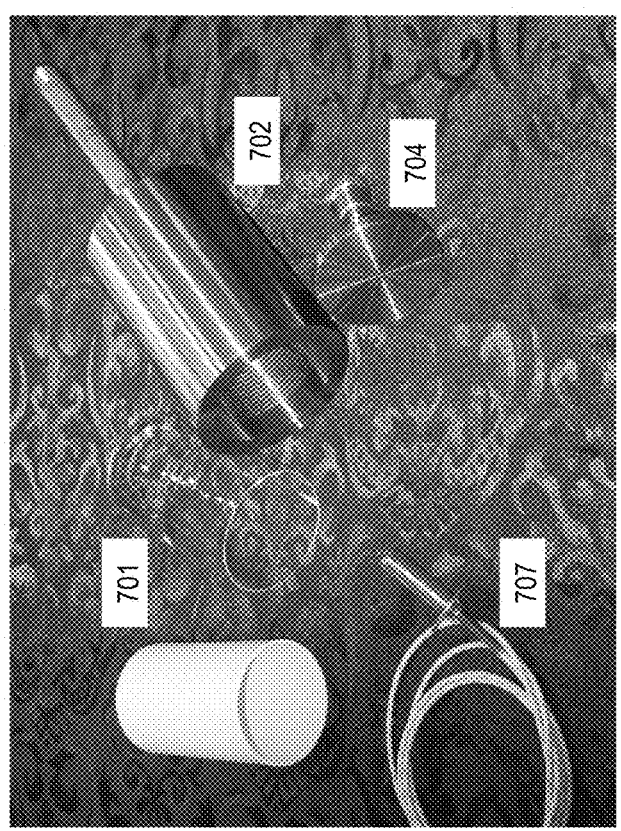
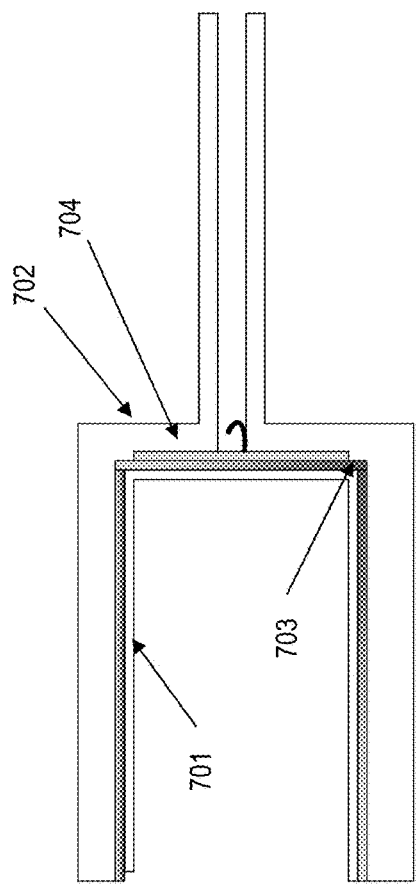
FIG. 3A
FIG. 3B
FIG. 3

MODULAR COOLING CHAMBER FOR MANIFOLD OF GASEOUS ELECTROLYSIS APPARATUS WITH HELIUM PERMEABLE ELEMENT THEREFOR

CROSS-REFERENCE TO RELATED APPLICATIONS

This Application claims the benefit under 35 U.S.C. § 119(e) of U.S. Provisional Patent Application No. 62/389,549 filed Mar. 3, 2016, the contents of which is incorporated herein by reference in its entirety. This application is also related to U.S. patent application Ser. No. 15/438,768, filed Feb. 22, 2017, published on Mar. 29, 2018 as US Patent Publication No. US2018/0087165 A1, a continuation-in-part of U.S. patent application Ser. No. 14/815,935, filed on Jul. 31, 2015, which claims the benefit of U.S. Patent Application No. 61/999,824, filed on Aug. 7, 2014, which further incorporates by reference U.S. Pat. No. 6,248,221, issued Jun. 19, 2001, filed on Jun. 1, 1999 as U.S. patent application Ser. No. 09/322,690, to Davis, et al.

BACKGROUND

Field of the Disclosure

The present disclosure relates generally to improved materials, structures and methods for improving the cooling chambers of reaction gas product collection manifolds for electrolysis systems that employ hydrogen and/or deuterium gas for production of heat. This disclosure also specifically addresses improvements to cooling chambers of reaction gas product collection manifolds.

Related Art

A body of knowledge contained in over a thousand books and technical papers has documented the advances made over the last 25 years in the field of Low Energy Nuclear Reactions (LENR). An early design concept for a gaseous electrolysis apparatus that can use hydrogen and/or deuterium gas for production of heat was provided in a paper on "Critical Factors in Transitioning from Fuel Cell to Cold Fusion Technology," by T. McGraw and R. Davis in August 1998, which also indicated the need to collect reactant product helium. Hundreds of watts of heat per cubic centimeter of cathode material have been demonstrated to be produced in some electrolysis systems. Systems designs for apparatuses that produce kilowatts of energy, therefore, must enable greater than 10 to the exponent 16 nuclear reactions per second to be sustained, with the assumption that each reaction nets several million electron volts (MeV) of energy. Reactant product helium gas molecules can be anticipated to be produced at approximately this rate.

It is desirable that improved systems be provided to overcome shortcomings of conventional gaseous electrolysis apparatuses and systems and to provide useful products from such systems.

SUMMARY OF THE INVENTION

Example embodiments of the disclosure set forth systems for capturing and collecting diffusion of helium through permeable elements in cooling chambers of reaction gas product collection manifolds for a gaseous electrolysis apparatus. Embodiments of the present disclosure set forth an improved cooling chamber for reaction gas product collection manifolds of gaseous electrolysis systems that employ hydrogen and/or deuterium gas for production of heat, according to an exemplary embodiment, including an exemplary helium permeable element to enable the separation/extraction and recovery of helium reactant product gas from a gas mixture of helium and other gases and an exemplary means to physically support and cool the outbound side of the helium permeable element. In addition, this disclosure provides an exemplary protective buffer cushion between the permeable element and its physical support; an exemplary disk insert installed in the physical support to assist installation and removal of the helium permeable element; an exemplary, flexible, low permeability seal(s) to secure the helium permeable element to its physical support; an exemplary heater closely adjacent to the permeable element to enable the fragile permeable element to be heated and cooled gradually so as to prevent its breakage; an exemplary thermal sensor installed within the cooling chamber to determine temperature of gas in the cooling chamber adjacent to the inbound side of the helium permeable element; and an exemplary high pressure and temperature electric feedthrough to enable connection of the heater and thermal sensor with an electronic control circuit or system, according to example embodiments. An aspect of an exemplary embodiment of the present disclosure is to provide modular components for the cooling chamber that can be manufactured by industry.

An aspect of an exemplary embodiment of the present disclosure is to provide a new design for the cooling chamber of the reaction gas product collection manifold. One aspect of the disclosure, in an exemplary embodiment, is that the cooling chamber design advantageously enables helium reactant gas product (helium-3 and/or helium-4) to be removed from reactors of electrolysis systems that employ hydrogen and/or deuterium to produce heat. According to another aspect of an exemplary embodiment, the new cooling chamber design enables helium to be separated, where hydrogen, deuterium and carrier gas, e.g., argon, are not desired to be removed. According to another aspect of an exemplary embodiment of the disclosure, the cooling chamber design can facilitate a thermal gradient through the permeable element. By comparison, and with reference to the nonobviousness of the embodiments under 35 USC § 103, other sources of information do not disclose an improved cooling chamber with permeable element to enable removal of helium reactant gas from these systems.

Another aspect of an exemplary embodiment of the present disclosure is that the cooling chamber of the gas product collection manifold can contain components to enable piping in the gas product collection manifold to be cooled to protect downstream components, e.g., electric valves. According to another example aspect of an exemplary embodiment of the present disclosure, the outbound cooling section of the cooling chamber can contain a combination physical support for the helium permeable element and gas piping to provide a thermal gradient across the helium permeable element and cooling of gas before it reaches the first downstream electric valve in the reaction gas product collection manifold.

An aspect of an exemplary embodiment of the present disclosure is to provide an exemplary protective buffer cushion between the permeable element and its physical support. An aspect of an exemplary embodiment of the present disclosure is to provide an exemplary disk insert installed in the physical support to assist installation and removal of the helium permeable element. Yet another aspect of an exemplary embodiment of the present disclosure is to take advantage of gas pressure and temperature of inbound gas from the reaction chamber to promote gas transport into and through the helium permeable element. According to another aspect of an exemplary embodiment of the disclosure, the resulting comparatively high temperature and pressure of the inbound surface of the helium permeable element and low temperature and pressure of its outbound surface can produce pressure and thermal gradients to support diffusion of reactant gas through the permeable material over long periods of operation. Another aspect of an exemplary embodiment of the disclosure is to provide an exemplary, flexible, low permeability seal(s) to secure the helium permeable element to its physical support.

Another aspect of an exemplary embodiment of the present disclosure is to provide a capability to control temperatures on each side of the helium permeable element. According to an exemplary embodiment, a heater closely adjacent to the permeable element can enable the permeable element to be heated and heat decreased gradually so as to prevent its breakage. According to another aspect of an exemplary embodiment of the disclosure, a temperature sensor within the inbound section of the cooling chamber can determine temperature of gas in the cooling chamber adjacent to the inbound side of the helium permeable element. According to yet another aspect of an exemplary embodiment of the disclosure, an electric feedthrough installed in the cooling chamber can enable connection of the heater and thermal sensor with an electronic control circuit or system.

According to one example embodiment, a cooling chamber for reaction gas product manifolds of a gaseous electrolysis apparatus, can include: a helium permeable element; and, at least one of: a physical support; or a support cup, coupled to said helium permeable element.

According to one example embodiment, the cooling chamber can include at least one of: a protective buffer cushion for said helium permeable element; a support disk insert to assist installation and removal of said helium permeable element; a low permeability seal or seals to secure said helium permeable element to its physical support; a heater; a thermal sensor; or, a high pressure electric feedthrough.

According to one example embodiment, the cooling chamber can include said helium permeable element can include at least one of: zirconia, fused silica, or silica glass.

According to one example embodiment, the cooling chamber can include at least one of: a physical support; or a support cup coupled to said helium permeable element.

According to one example embodiment, the cooling chamber can include: a protective buffer cushion between said helium permeable element and a metal support cup.

According to one example embodiment, the cooling chamber can include a low permeability flexible seal or seals to secure said helium permeable element to its physical support.

According to one example embodiment, the cooling chamber can include: a protective buffer cushion for said helium permeable element; a support disk insert to assist installation and removal of said helium permeable element; a low permeability seal or seals to secure said helium permeable element to its physical support; a heater; a thermal sensor; and a high pressure electric feedthrough.

BRIEF DESCRIPTION OF THE DRAWINGS

The embodiments are described with reference to the drawings in which like elements are denoted by like or similar numbers and in which:

FIG. 3, which includes FIGS. 3A and 3B, collectively illustrates an exemplary embodiment according to the present disclosure of the helium permeable element, an example metal support cup thereof, an example protective buffer cushion and an example disk insert in the physical support that assists installation and removal of the helium permeable element of the embodiment.

DETAILED DESCRIPTION OF VARIOUS EXEMPLARY EMBODIMENTS

Introduction

Figure 1:
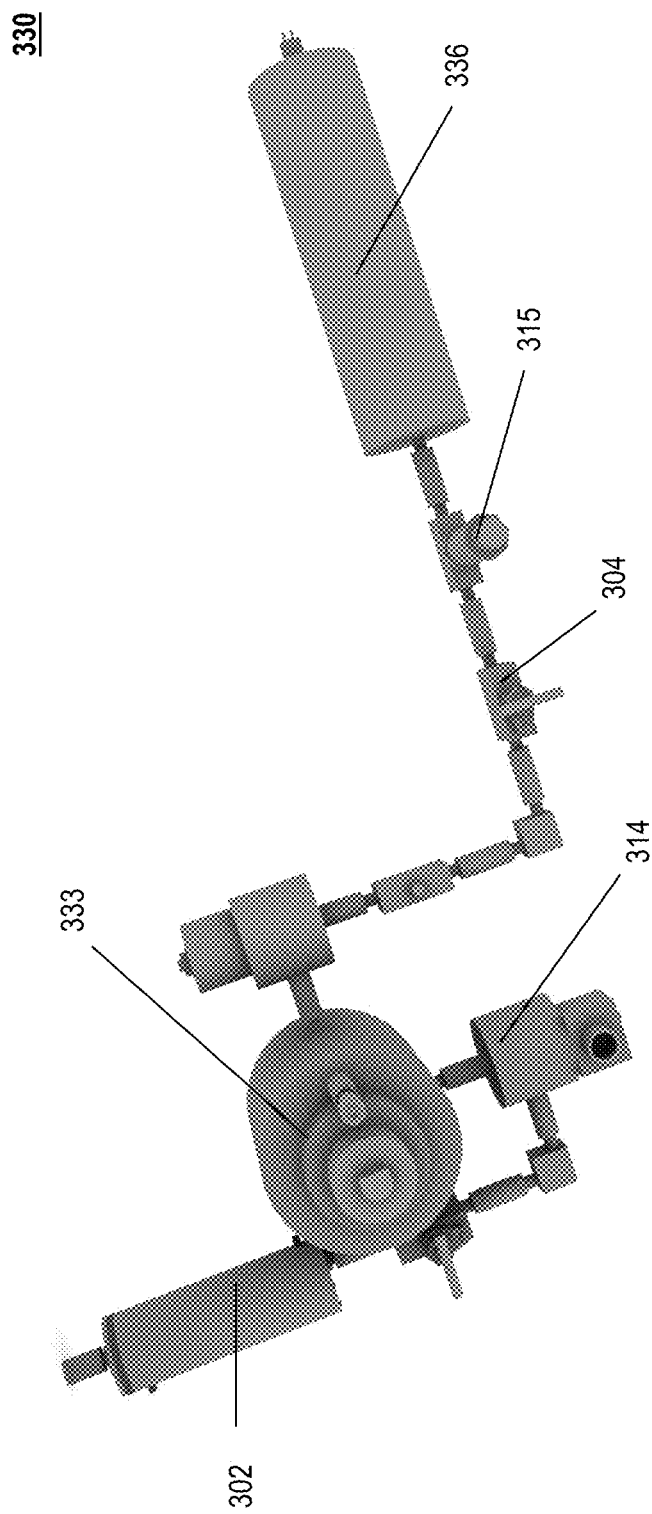
FIG. 1 indicates an exemplary embodiment of the exemplary reaction gas product collection manifold for the electrolysis systems, showing an example location of the cooling chamber of the manifold, in the upper left portion of the diagram.

Various exemplary embodiments are disclosed below in the detailed description of the various drawings, including any preferred embodiments.

Substantial utility (ref 35 USC § 101) can be obtained by removal of the helium reactant product gas (helium-3 and/or helium-4) from reactors of electrolysis systems that employ hydrogen and/or deuterium to produce heat. Removal of helium reactant product gas by the manifold can enable additional hydrogen and/or deuterium to be added to the reactor or reaction vessel, enabling the system to operate for much greater periods of time than systems where helium is not removed, in one embodiment. This can be crucial, for example, for spacecraft power applications and unattended power applications in remote areas where sustained operations are required for long periods of time, according to example embodiments. A capability to remove incremental and pre-determined quantities of helium, with the addition of hydrogen and/or deuterium to the reactor, can be used to help balance pressure-related, variable operating conditions within the reactor and support maintenance of consistent pressure and temperature operating conditions in various example embodiments. Helium reactant gas extraction through the manifold can enable the gas to be sampled and to be analyzed to investigate reactions within the reactor in example embodiments. Additionally, government directives for controlling helium usage have stimulated incentives for the saving and re-use of helium as an irreplaceable natural resource of limited extent. Supplies of helium-3 are particularly limited and of high cost. Collection and storage of helium reactant product gas can result in a profitable resource with a number of commercial uses, according to exemplary embodiments.

Many methods of helium-4 separation have been investigated including diffusion, adsorption, cryogenics, fractional distillation, Becker nozzles, and centrifuges. Diffusion relying upon the permeability of helium through materials has been the most studied and applied in practical systems to separate helium from other gases, e.g., for the gas industry. Sufficiently high helium diffusion rates are possible due to helium's small, monoatomic molecule diameter compared, e.g., with hydrogen's larger diatomic molecule diameter. Helium diffusion rate through materials and seals has also been extensively studied by others in relation to leak testing methods, such as those used to ensure mechanical integrity of piping. The present application makes use of this knowledge to enable the separation/extraction and recovery of helium reactant product gas from a gas mixture of helium and other gases with a helium permeable element in the cooling chamber of the system's reaction gas product collection manifold. Gases within the reactor or reaction vessel can include hydrogen isotopes (protium, deuterium, tritium), helium isotopes (helium-3 and helium-4) and carrier gas (such as argon). The apparatus, according to example embodiments, can enable helium to be separated, while hydrogen and deuterium (and carrier gas, e.g., argon) are not desired to be removed. The helium gas can be removed, according to an example embodiment, and can be stored without use of "purifiers"/"purification" where the other gases would be required to be adsorbed or otherwise removed from the gas mixture, i.e., by a getter or absorber, and without additional valves or pumps that may be required by some other methods of separation.

The amount of helium that is able to diffuse in a steady state through the permeable element can be expressed as $J=-D\, dc/dx$, (Fick's first law) where J is the amount transmitted per unit time per unit area, D is the diffusion coefficient/constant and dc/dx is the concentration gradient of helium within the material, in an example embodiment. With solubility of helium in the permeable material assumed to be very low, $c=Sp$, (from Henry's Law) where S is the solubility/absorption coefficient and p is pressure of the gas. Substituting in the above equation, $J=-DS\, dp/dx$, showing that the rate of diffusion increases with increasing gas pressure gradient, in an example embodiment. The product DS is known as permeability or "permeability constant" (P=DS) for the material.

Diffusion and solubility (D and S) obey Arrhenius relations, $S=S_o\, e^{-\Delta H/RT}$ and $D=D_o\, e^{-E_d/RT}$, where $\Delta H$ is the heat of solution of gas in the material and $E_d$ is the activation energy of diffusion within the material, in an example embodiment. Thus, with $E_p=H+E_d$, $P=P_o\, e^{-E_p/RT}$, showing that (with positive $E_p$), the rate of diffusion increases with increasing temperature. An article on "The Diffusion of Hydrogen and Helium through Silica Glass and other Glasses," by G. A. Williams and J. B. Ferguson in 1922 demonstrates that permeability of silica glass both to helium and hydrogen is proportional to gas pressure and an exponential function of temperature. Permeability to helium is much larger than permeability to hydrogen, in an example embodiment. Permeability of helium through fused quartz (est. $10^{13}$ atoms per second per $cm^2$ for 1 mm thick samples at 300° C. and pressure difference of 1 atmosphere) compared with hydrogen and deuterium was discussed in "Diffusion Coefficients of Helium in Fused Quartz," by D. E. Swets et al., in 1961 and in "Diffusion of Hydrogen and Deuterium in Fused Quartz," by R. W. Lee et al. in 1962. Values were obtained through a series of steady state measurements with different, but constant temperatures and pressures, in an example embodiment.

Information on steady state diffusion of helium through permeable materials has been applied for in a number of patents. U.S. Pat. No. 3,019,853, "Separation of Gases by Diffusion," by Kohman and McAfee (February 1962) discusses use of a large number of silica (e.g., pyrex glass) capillary tubes, high pressure and elevated temperature to separate helium from a mixture of gases and, importantly, pointed out that only the helium will pass through the tubes up to about 300° C. Capillary tubes were used because of their strength to high external pressure. U.S. Pat. No. 3,250,080, "Method of Separating Gaseous Mixtures by Diffusion and Fractionation," by Garwin (May 1966) discusses the manner in which a series of connected diffusion cells can be used to separate gases from a mixture of gases. U.S. Pat. No. 3,269,817, "Manufacture of Helium Separation Apparatus," by Bondley (August 1966) discusses an improvement in methods that use capillary tubes to separate helium at higher temperatures. The contents of these patents are incorporated herein by reference in their entireties.

By comparison, and in reference to nonobvious of various example embodiments under 35 USC § 103, the permeable element of the present disclosure can be in the form, e.g., of a thin parallel-wall crucible or cup that lines the inside of a metal (e.g., stainless steel) support cup, so as to take advantage of physical strength that the metal cup provides for the permeable element or liner, in an example embodiment. The configuration can enable high gas pressure and elevated temperature steady state separation factors to be used effectively in separating reaction product helium from hydrogen isotopes and carrier gas coming into the reaction gas product collection manifold, particularly when helium is in a relatively high concentration, in an example embodiment. The permeable element can be inside the metal cup to support its physical integrity during thermal cycles of the manifold, in an example embodiment. These physical aspects of the present application are novel. The physical aspects are significantly different from other conventional separation device designs and depend upon unique technical concepts in the design that were not previously self evident to a person having ordinary skill in the art. The metal cup, according to an example embodiment, providing physical support for the permeable liner can be cooled to a temperature significantly lower than the temperature of the gas input to the manifold so that average temperature of the permeable element is approximately and no more than about 300° C., in an example embodiment. Also the outbound side of the permeable liner or element can be cooler than its input side contacting the hot gas entering the manifold cooling chamber, in an example embodiment. The thermal gradient across the permeable element can increase helium diffusion rate by thermal migration or "thermomigration" as discussed, for example, in "Perspectives in Materials Research," by Himmel et al. (ed) in 1963 and in "The Influence of Temperature Gradients on Partial Pressures in a CVD Reactor," by T. G. M. Oosterlaken et al. in 1993. This aspect of the present invention is also novel and not previously self evident to a person having ordinary skill in the art.

Materials for construction of the permeable element can be determined from a list of materials able to withstand high temperature and known from the technical literature to be effective in separating helium from other gases, in one example embodiment. Polyethylene as discussed in "Permeability of Solids to Gases," by A. P. Brady et al. in 1963, was not considered to be applicable due to its relatively low melting temperature, in another example embodiment. Zirconia, fused silica and silica glass were considered to be the best materials to use for the permeable element, in an example embodiment. Zirconia can be manufactured with an average particle size of less than 100 Angstroms and a purity of 99.9 percent, for example, by vapor phase deposition, as discussed in "An Approach to the Preparation of Powders, Fibers, and Films of Ultra-High Purity Ceramics," by K. S. Mazdiyasni and C. T. Lynch in 1964. An important characteristic of $ZrO_2$ is that the metal-oxygen bond is very stable up to about 300° C. but can transition to a different phase at a higher temperature. Cooling of the metal cup providing physical support for the helium permeable element can maintain temperature of the permeable element below about 300° C. Application of zirconia, in an example embodiment, (permeability to helium est. $10^{15}$ atoms per second per square centimeter for a 1 mm. thick element and pressure difference of about 1 atmosphere) to remove helium from nuclear reactor containment vessels is discussed in NASA CR-72603 by W. R. Seetoo and J. W. McGrew in 1969, where permeability of zirconia to helium was shown to be much larger than permeability to hydrogen. Fused silica, in an example embodiment, is considered as a promising construction material for the permeable element also because of its permeability to helium (est. about $10^{13}$ atoms per second per square centimeter across 1 mm at 300° C. with a pressure difference of 1 atmosphere) as discussed in "Permeation in Fused Silica," by J. S. Masaryk and R. M. Fulrath in 1971.

These and other supporting data from the technical literature demonstrate that a helium permeable element installed in the cooling chamber of reaction gas product collection manifolds can have the capability to separate helium reactant gas product effectively from a mixture of helium and other gases, in an example embodiment. The permeable elements need to be maintained at a temperature not exceeding about 300° C., consist of, or comprise of, many square centimeters of surface area and operate at the high pressure of the reaction gas product collection manifold, in one example embodiment. The above data indicate that 1-2 mm thick permeable elements manufactured from zirconia, fused silica or silica glass, that have a surface area of at least a few tens of square centimeters (e.g., 50 $cm^2$) and that are subjected to at least 10 atmospheres of pressure can provide capabilities to separate helium effectively at a rate of at least $10^{16}$ atoms per second, according to an example embodiment. Thermal migration due to a thermal gradient across the permeable element where its outbound side is cooler than its input side can increase the helium diffusion rate, in an example embodiment.

An exemplary embodiment of the disclosure sets forth improvements to an exemplary cooling chamber in reaction gas product collection manifolds of electrolysis systems that employ hydrogen and/or deuterium to produce heat to enable these systems to operate for longer periods of time than systems where helium is not removed. The present disclosure sets forth features enabling these cooling chambers to be manufactured by industry.

Information in the previous and the following paragraphs includes preferred embodiments and various alternative exemplary embodiments for the disclosure, operational conditions for the disclosure and information on modes of practicing the disclosure. The exemplary improvements discussed support key design parameters of the exemplary apparatus, such as, e.g., but not limited to, sufficient surface area of the permeable element, materials of manufacture, operating temperature and pressure. This information enables the subject matter of the claims (35 USC § 112) and teaches or demonstrates how to use this invention (35 USC § 112(a) and pre AIA 35 USC § 112). FIGS. 1-4, in accordance with 37 CFR § 1.121(d), include a depiction of each claimed component.

FIG. 1 illustrates an exemplary embodiment of a reaction gas product collection manifold 330 according to the present disclosure which can connect or couple to an output port of reaction chambers (not shown) on the left, input side of the manifold. The manifold can be constructed as a continuous unit to prevent air from entering the manifold or reaction chamber, in an exemplary embodiment. According to one aspect of this disclosure, the gas manifold can include a cooling chamber or water jacket 302 as shown in FIG. 1 that can provide cooling for its gas tubing and pipes for carrying away heat produced by the reaction chamber, in an exemplary embodiment, thereby, for example, preventing heat from harming the materials with which the electric valves may be constructed. FIG. 1 depicts an exemplary top perspective view of an exemplary reaction gas product collection manifold 330, according to an exemplary embodiment. Depicted is an exemplary reaction gas product collection manifold 330, including, e.g., but not limited to, an exemplary cooling chamber 302, exemplary mechanical valve(s) 304, exemplary electric valve(s) 314, an exemplary separator valve with an electronic interface for matter output 333 to measure quantities of reactant gas produced, an exemplary pressure sensor 315, and an exemplary reaction gas collection tank/bottle with thermal sensor 336, according to one exemplary embodiment. The reaction gas product manifold 330 is designed for safety to withstand high pressure and to contain a low gas volume, in an exemplary embodiment. The reaction gas product manifold, in an exemplary embodiment, can be designed and engineered, however, to operate only when reaction gas needs to be collected, whereupon manifold valves 314 can be operated to move gas product into the collection tank/bottle, in an exemplary embodiment. The valves can be closed during other periods of operation, such as during start-up and maintenance periods, in an exemplary embodiment. The disclosure of this patent application sets forth various example improvements to cooling chamber 302 of the reaction gas product collection manifold 330, in example embodiments.

Figure 2:
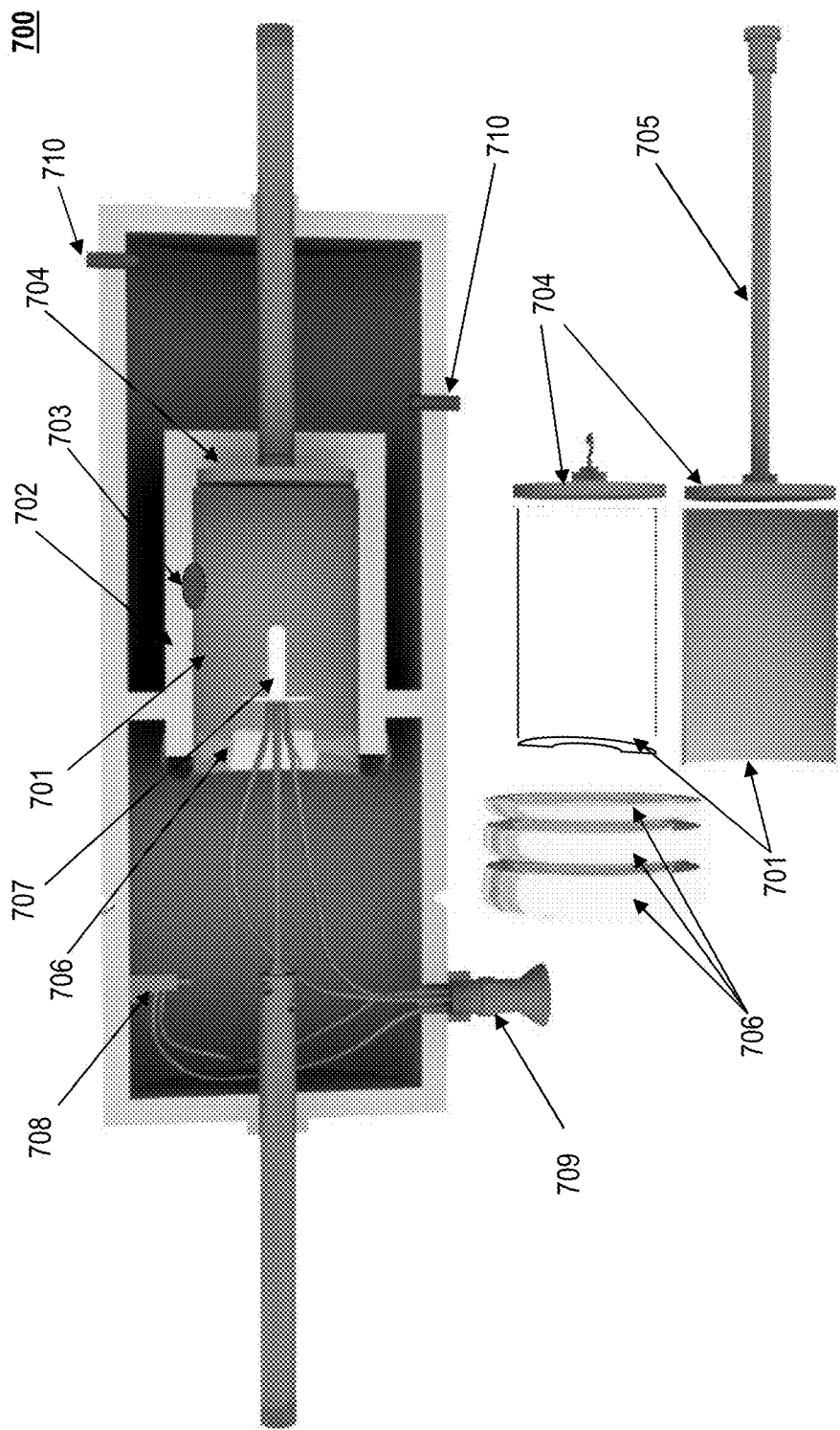
FIG. 2 indicates an exemplary cutaway one half view of the exemplary improved cooling chamber to enable helium reactant product gas to be separated and removed from the system. The inbound section to the left of the figure contains an example heater and thermal sensor and interfaces with a helium permeable element and one or more seal(s) to secure the helium permeable element to an example metal support cup of one embodiment. The outbound section contains the example metal support cup as well as piping to cool the gas transmitted downstream from the cooling chamber of the embodiment.

FIG. 2 illustrates an embodiment of an improved cooling chamber 700 for the reaction gas product collection manifold (described further with reference to FIG. 3) including a hot, high pressure gas input side to the left and cool, low pressure side to the right of the diagram, separated by a thick wall and metal cup 702 to support the helium permeable element or liner 701, also in approximately the same shape, in an example embodiment. The input side to the left has a large enough volume to contain a quantity of gas that is many orders of magnitude greater than an amount necessary to contact the inbound side of the helium permeable element for separation of the helium reactant gas product, in an example embodiment. The cooling side contains a volume for coolant sufficient to cool the thick wall and metal support cup, gas exiting from the cooling chamber and its piping, in an example embodiment.

FIGS. 2 and 3 also illustrate other key parts of the improved cooling chamber for the reaction gas product collection manifold, including an exemplary protective buffer cushion 703 between the permeable element 701 and an example metal support cup 702; an exemplary metal disk insert 704 installed in the metal support cup to assist installation and removal of the helium permeable element; an exemplary, flexible, low permeability seal(s) 706 to secure the helium permeable element to its physical support; an exemplary heater 707 closely adjacent to the permeable element to enable the fragile permeable element to be heated and heat decreased gradually so as to prevent its breakage; an exemplary thermal sensor 708 installed within the cooling chamber to determine temperature of gas adjacent to the inbound side of the helium permeable element; and an exemplary high pressure and temperature electric feedthrough 709 to enable connection of the heater and thermal sensor with an electronic control circuit or system, according to an example embodiment. Cooling of the outbound side of the cooling chamber is provided by the flow of a liquid coolant (e.g., water) through fittings 710 in the outbound side, in an example embodiment.

The helium permeable element 701 in one embodiment can be in the shape of a parallel-wall crucible or cup providing a relatively large surface area adjacent to and contacting gas on its inbound side. In one example embodiment, the helium permeable element can provide at least a few tens of square centimeters (e.g., 50 $cm^2$) of surface area for separation of reactants. The helium permeable element in an example embodiment can be relatively thin (e.g., 1-2 mm. thickness) and composed of zirconia, fused silica or silica glass (e.g., reference CoorsTek zirconia and Corning 7979/7980 fused silica). The helium permeable element can be manufactured by industry as a separate, replaceable component of the cooling chamber, according to an example embodiment. For increased strength, the helium permeable element can also be made in the shape of a parallel-wall, round-bottom crucible, according to one example embodiment. All such alternative helium permeable materials and configurations can thereby be considered to be within the scope of various example embodiments of the disclosure.

In one example embodiment, the support 702 for the helium permeable element can be in the shape of a parallel-wall crucible or cup that can closely match the shape of the helium permeable element, according to an example embodiment. The support, and its surrounding wall, in an example embodiment can be constructed of sufficiently thick, non-porous, thermally-conducting metal (e.g., stainless steel) to withstand the high pressure and temperature gas impressed on it and the helium permeable element, according to an example embodiment. The exemplary support and its surrounding wall, in an example embodiment can necessarily prevent hot, high pressure gas in the inbound side of the cooling chamber from leaking into the cooling side containing coolant and piping, according to an example embodiment.

Yet another important aspect of the exemplary embodiments of the present disclosure is to provide an exemplary thermally conductive buffer cushion 703 for the helium permeable element. In one embodiment, the cushion can provide physical support to protect the helium permeable element when exposed to the varying and high pressure gas in the inbound side of the cooling chamber. The cushion in an example embodiment can occupy any gap between the helium permeable element and the support cup described above, and can consist of, or can comprise of, for example, of relatively soft metal powder, according to an example embodiment. In an example embodiment, particles of metal powder can be a mixture of sizes of a few microns in diameter that can be inserted between the helium permeable element and its metal support. The buffer particles in an embodiment of the present disclosure can be induced to flow into the gap between the helium permeable element and its support cup by means of flowing air produced by a vacuum pump attached to the manifold's output pipe, according to an example embodiment. A small micro-filter can be inserted into the support cup to prevent the small particles from contaminating the manifold's downstream components, in an exemplary embodiment.

In one example embodiment, the helium permeable element is also provided support by an exemplary support disk 704 reset within the metal support cup described above and as depicted in FIGS. 2 and 3. The support disk in an example embodiment can be used to assist in installation and removal of the helium permeable element from its support cup. The support disk, according to an example embodiment, can also enable separated helium reactant product to move unrestricted into the downstream piping of the cooling chamber and reaction gas product collection manifold. In one embodiment, the support disk can be held in place while the helium permeable element is installed by an exemplary metal hook or fixture welded to the back of the support disk. A strap or wire can be temporarily attached to the hook or a long metal bolt 705 can be screwed temporarily into the fixture to hold the support disk in place during insertion of the helium permeable liner, according to an example embodiment. In one example embodiment, the support disk can be thermally conducting and made of the same material as the example metal support cup.

Another aspect of an exemplary embodiment of the present disclosure is to provide an exemplary very low permeability, flexible seal(s) 706 to secure the helium permeable element to its example metal support. In one embodiment, the exemplary flexible seal(s) can enable the helium permeable element to physically expand and contract with changing temperature and pressure conditions in the cooling chamber, while preventing hydrogen from leaking downstream. In an example embodiment, the flexible seal(s) can be bonded to the helium permeable element and metal support, for example, by ceramic-to-metal and metal-to-metal brazing techniques, according to an example embodiment. In an example embodiment, the flexible seal(s) can be bonded to the helium permeable element and metal support by very low permeability, high temperature cement, according to an example embodiment.

In an example embodiment, the cooling chamber can include an exemplary heater 707, such as, e.g., but not limited to, a cartridge-type heater (e.g., reference Dalton Electric Heating Company model W3H014) centered in the helium permeable element, according to an example embodiment. The example heater can supply a gradual and controlled amount of radiant heat to increase temperature of the permeable element slowly and prevent the element from cracking due to thermal stresses that would otherwise be produced from very rapid temperature changes. In one embodiment, heat energy provided from the heater can be increased over several hours to a set, pre-determined operating temperature for the helium permeable element. Heat energy provided from the heater can similarly be used to gradually reduce the temperature of the helium permeable element to prevent it from cracking due to thermal stress, according to an example embodiment. Heater operation can be controlled by the system's example electronic control circuitry.

A thermal sensor 708 in an example embodiment can be installed within the cooling chamber to provide a capability to accurately determine temperature of gas adjacent to the inbound side of the helium permeable element, according to an example embodiment. An example electric feedthrough 709 in one embodiment can enable connection of the thermal sensor and heater with an electronic control circuit or system, according to an example embodiment. The exemplary electric feedthrough 709, e.g., can be a high temperature and pressure electric feedthrough, and can include electrical conducting members and insulating material such as alumina or glass, according to an example embodiment. In one embodiment, the exemplary feedthrough can also be built so that the pressure side of the feedthrough can be directed toward the inside of the cooling chamber. Connections or couplings, in an exemplary embodiment, can be made from the pressure side of the feedthrough to the heater and temperature sensor located within the cooling chamber, according to an example embodiment. Additionally, a 4-wire connection can be made available to the heater and temperature sensor through the pipe from the reaction chamber (not shown) into the cooling chamber if this were more able to be utilized than connections through the feedthrough, according to an example embodiment. The thermal sensor and feedthrough can be manufactured by industry as separate components of the cooling chamber, in an example embodiment.

Figure 4:
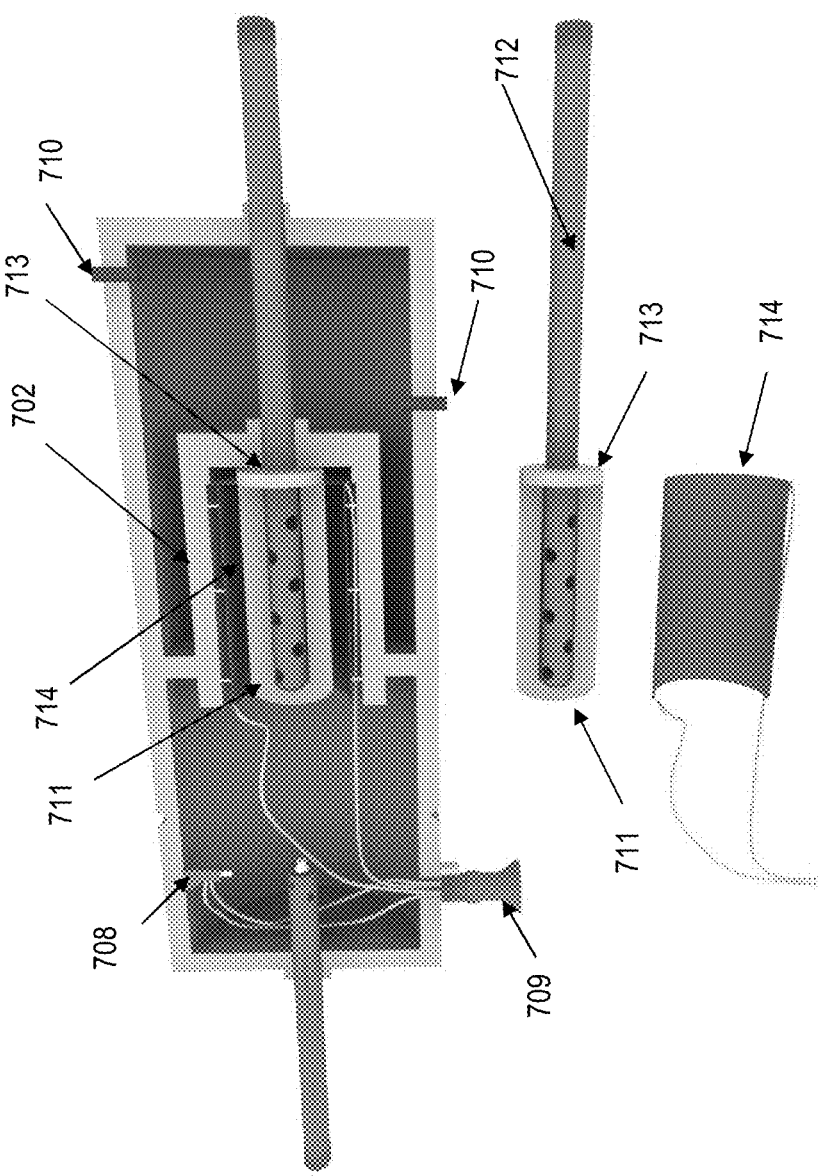
FIG. 4 is an exemplary cutaway one half view of an alternate cooling chamber design where the helium permeable element and cartridge heater of FIGS. 2 and 3 are replaced by a helium permeable coating surrounding a separator support pipe and thin film heater in an example embodiment. The example thin film heater is supported by a modification to the example metal support cup of FIGS. 2 and 3 in one embodiment.

FIG. 4 is an exemplary cutaway one half view of an example possible alternate cooling chamber design 740 where the inbound high pressure and temperature section to the left of the figure contains a permeable element 711 mounted onto a separator support pipe 712, according to an example embodiment. As previously disclosed, the helium permeable element in a one preferred example embodiment can be relatively thin (e.g., 1-2 mm. thickness) and composed of zirconia, fused silica or silica glass, according to an example embodiment. In an exemplary embodiment, the helium permeable element for this alternate example design can be in the shape of a round bottom crucible inserted onto the support pipe as shown in FIG. 4, according to an example embodiment. The support pipe can contain small holes as depicted in FIG. 4, through which helium can flow into to the cooling chamber's output pipe, according to an example embodiment. In an exemplary embodiment, the support pipe can contain a seal disk 713 upon which the helium permeable element can be securely attached, e.g., with a very low permeability, high temperature cement, according to an example embodiment. In an exemplary embodiment, a thin film heater 714 can be used to heat the inbound surface of the helium permeable element, according to an example embodiment. The helium permeable element and thin film heater can be manufactured by industry as separate, replaceable components of the cooling chamber, according to one example embodiment.

Assembly and Operation

The following illustrative details can enable one skilled in the art to assemble the apparatus of an example embodiment's custom-designed and off-the-shelf parts without an undue amount of additional research into system design, according to an example embodiment. Many technology companies already have capabilities to make and assemble the structural body e.g., stainless steel, of the cooling chamber, according to an example embodiment. Separation of helium from other gases in the present disclosure, although not obvious or previously disclosed or described, makes use of relatively-common technical knowledge to provide improvements to cooling chambers of reaction gas product collection manifolds. The improvements, according to an example embodiment, can require application of a material for the helium permeable element that is sufficiently permeable to helium and significantly less permeable to hydrogen, deuterium and tritium, that can withstand temperature and pressure gradients across the material, and that is sufficiently physically robust to withstand many temperature and pressure cycles related to electrolysis system and cooling chamber operation, according to an example embodiment. The helium permeable element must also be installed and sealed to other parts of the improved cooling chamber in a manner that prevents the element from being damaged through many high pressure and temperature cycles of operation and that does not permit any significant amount of hydrogen to leak downstream of the helium-permeable element, according to an example embodiment. The helium permeable element, buffer cushion material, heater, temperature sensor and electric feedthrough can be purchased as off-the-shelf parts, according to one example embodiment.

The reaction gas product collection manifold, according to an example embodiment, can be designed and engineered to operate in a relatively continuous manner through periodic operation of manifold valves to move gas into the cooling chamber and gas product into its collection tank/bottle. The number of helium molecules that can be produced per second is estimated to be about the same as the number of nuclear reactions, according to one example embodiment. A year of continuous operation at 10 to the exponent 16 nuclear reactions per second can produce $3 \times 10^{23}$ helium molecules (0.5 mole) that occupy about 11 liters. Systems producing 200 kilowatts can develop 10 times this amount, according to an example embodiment. Manifold valves, in one embodiment, can be closed during start-up and maintenance periods. The amount of helium desired to be separated can be minimal during early reactor turn-on and operation, and can increase in very small molecular amounts (e.g., millionths of a mole), according to an example embodiment. Example valves for the gas product collection manifold can remain closed during this early operational period, and no pressure or temperature gradient impressed across the helium permeable element, according to an example embodiment. The amount of helium and relative concentration to be separated can be increased during later periods of operation, according to an example embodiment. The manifold can then be made to operate during periods of electrolysis system operation when the concentration of helium reaction gas product in the reactor is determined, for example, to be more than a few tens of percent compared with the concentration of hydrogen and/or deuterium, according to an example embodiment.

According to one example embodiment, for example, the device can conceivably be used in cascades or in a recycling mode to enhance helium product purity.

Other modifications and variations to the invention will be apparent to those skilled in the art from the foregoing disclosure and teachings. Thus, while only certain embodiments of the invention have been specifically described herein, it will be apparent that other modifications may be made thereto without departing from the spirit and scope of the invention.

Therefore, what is claimed is:

1. A gas product collection apparatus of a gaseous electrolysis thermal generator apparatus, wherein the gaseous electrolysis thermal generator apparatus is configured to produce heat through a reaction of a metallic cathode with hydrogen or deuterium, wherein the gaseous electrolysis thermal generator apparatus comprises a reactor chamber, a hydrogen or deuterium storage tank, and at least one manifold coupling the reactor chamber to the hydrogen or deuterium storage tank, the gas product collection apparatus comprising:

cooling chamber for a modular reaction gas product manifold of the gaseous electrolysis thermal generator apparatus, comprising:
 a helium permeable element cup,
  wherein said helium permeable element cup comprises:
   an internal surface area sufficient to separate a desired number of helium (He) atoms at a rate of at least $10^{16}$ atoms per second.

2. The apparatus according to claim 1, wherein said cooling chamber comprises at least one or more of:
 a protective buffer cushion for said helium permeable element cup;
 a support disk insert to assist installation and removal of said helium permeable element cup;
 a low permeability seal or seals to secure said helium permeable element cup to said at least one of said physical support or said support cup;
 a heater;
 a thermal sensor; or,
 a high pressure electric feedthrough.

3. The apparatus according to claim 1, wherein said helium permeable element cup comprises at least one or more of:
 zirconia,
 fused silica, or
 silica glass.

4. The apparatus according to claim 1, wherein said cooling chamber further comprises at least one or more of:
 a physical support; or
 a support cup,
wherein said at least one or more of said physical support or said support cup is coupled to said helium permeable element cup.

5. The apparatus according to claim 4, wherein said cooling chamber comprises:
 a protective buffer cushion between said helium permeable element cup and said at least one or more of said physical support or said support cup.

6. The apparatus according to claim 4, wherein said cooling chamber comprises a low permeability flexible seal or seals to secure said helium permeable element cup to said at least one or more of said physical support or said support cup.

7. The apparatus according to claim 1, wherein said cooling chamber comprises:
 a protective buffer cushion for said helium permeable element cup;
 a support disk insert to assist installation and removal of said helium permeable element cup;
 a low permeability seal or seals to secure said helium permeable element cup to a physical support;
 a heater;
 a thermal sensor; and
 a high pressure electric feedthrough.

8. The apparatus according to claim 1, wherein said cooling chamber further comprises at least one or more of:
 a gas handling system coupled to said improved cooling chamber;
 a gas manifold coupled to said improved cooling chamber;
 a reaction gas product collection manifold; or
 a reaction gas product collector; or
 a reaction gas product collector mechanically coupled to a gas handling system.

9. The apparatus according to claim 1, wherein said helium permeable element cup comprises at least one or more of:
 zirconia,
 fused silica,
 zirconia, or
 fused silica.

10. The apparatus according to claim 1, wherein said helium permeable element cup comprises at least one or more of:
 a relatively thin thickness; or
 1 mm-2 mm thickness.

11. The apparatus according to claim 1, wherein said helium permeable element cup comprises said internal surface area comprising at least one or more of:
 a few tens of square centimeters;
 a few tens of square centimeters up to or equal to 50 square centimeters;
 about 50 square centimeters; or
 substantially 50 square centimeters.

12. The apparatus according to claim 4, wherein said cooling chamber comprises:
 wherein said at least one of said physical support or said support cup comprises at least one or more of:
  a stainless steel support; or
  a metal support.

13. The apparatus according to claim 1, wherein said cooling chamber further comprises at least one of:
 a protective buffer cushion for said helium permeable element cup;
 a support disk insert to assist installation and removal of said helium permeable element cup;
 a low permeability seal or seals to secure said helium permeable element cup;
 a low permeability seal or seals to secure said helium permeable element cup to at least one of a physical support or a support cup;
 a heater;
 a thermal sensor; or,
 a high pressure electric feedthrough.

14. The apparatus according to claim 1, wherein said cooling chamber is configured such that when subjected to at least 10 atmospheres of pressure, is configured to separate helium effectively at a rate of at least $10^{16}$ atoms per second.

15. The apparatus according to claim 1, wherein said cooling chamber is coupled to a gaseous electrolysis apparatus.

16. The apparatus according to claim 1, wherein said helium permeable element cup of said cooling chamber further comprises said modular reaction gas product manifold, wherein said helium permeable element cup is configured to at least one or more of:
 separate helium reactant product gas;
 extract said helium reactant product gas; or
 recover said helium reactant product gas.

17. The apparatus according to claim 1, wherein said helium permeable element cup comprises:
 a cylindrical shape comprising:
  a circular portion comprising a diameter dimension; and
  a cylindrical wall portion comprising:
   a length dimension of approximately 1-3 times that of said diameter of said circular portion of said cylindrical shape of said helium permeable element cup; and
   a thickness dimension; and wherein said diameter dimension, said thickness dimension, and said length dimension of said helium permeable element cup determine said internal surface area.

18. The apparatus according to claim 17, wherein between said helium permeable cup comprises at least one or more of:
- wherein said cylindrical wall portion in cross-section is perpendicular to said circular portion of said cylinder;
- wherein said cylindrical wall portion comprises a cross-section comprising parallel walls;
- a crucible shape;
- a round bottom crucible shape;
- wherein said cylindrical wall portion in cross-section comprises a partially curved wall; or
- wherein said cylindrical wall portion in cross-section comprises a partial conical portion.

19. The apparatus according to claim 17, wherein said cylindrical wall comprising said thickness dimension comprises 1-2 mm in thickness.

20. The apparatus according to claim 4, further comprising:
- in between said helium permeable cup and said at least one of said physical support or said support cup, said cooling chamber comprises at least one or more of:
- a thermally conductive buffer cushion;
- a relatively soft metal powder;
- a plurality of buffer particles;
- a micro-filter; or
- a gap.

* * * * *